US008761543B2

(12) United States Patent
Bloomfield et al.

(10) Patent No.: US 8,761,543 B2
(45) Date of Patent: Jun. 24, 2014

(54) IMAGE PROCESSING USING BOUNDS ADJUSTMENT

(75) Inventors: Jeffrey R. Bloomfield, Bothell, WA (US); Michael Vincent Oneppo, Seattle, WA (US); Stephen P. Proteau, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 322 days.

(21) Appl. No.: 13/221,799

(22) Filed: Aug. 30, 2011

(65) Prior Publication Data

US 2013/0051701 A1 Feb. 28, 2013

(51) Int. Cl.
*G06K 9/36* (2006.01)
*G06K 9/48* (2006.01)
*G06K 9/32* (2006.01)

(52) U.S. Cl.
USPC .......................... 382/276; 382/199; 382/296

(58) Field of Classification Search
None
See application file for complete search history.

(56) References Cited

U.S. PATENT DOCUMENTS

| | | | | |
|---|---|---|---|---|
| 5,359,706 | A * | 10/1994 | Sterling | 345/657 |
| 6,038,031 | A * | 3/2000 | Murphy | 382/254 |
| RE38,410 | E * | 1/2004 | Hersch et al. | 709/203 |
| 7,315,647 | B2 | 1/2008 | Blake et al. | |
| 8,494,286 | B2 * | 7/2013 | Capata et al. | 382/218 |
| 2003/0039395 | A1 * | 2/2003 | Rondinelli et al. | 382/232 |
| 2003/0128882 | A1 * | 7/2003 | Kim et al. | 382/239 |
| 2006/0088202 | A1 * | 4/2006 | Venkatachalam | 382/152 |
| 2008/0273811 | A1 | 11/2008 | Jung et al. | |
| 2009/0208110 | A1 | 8/2009 | Hoppe et al. | |
| 2009/0232212 | A1 * | 9/2009 | Amon | 375/240.15 |
| 2009/0237516 | A1 * | 9/2009 | Jayachandra et al. | 348/208.4 |
| 2009/0249193 | A1 * | 10/2009 | Hanechak | 715/235 |
| 2009/0278953 | A1 | 11/2009 | Velthoven et al. | |
| 2010/0272330 | A1 * | 10/2010 | Pekar et al. | 382/128 |
| 2012/0050309 | A1 * | 3/2012 | Tsuchida et al. | 345/592 |

OTHER PUBLICATIONS

Chian, et al., "Region-based Image Retrieval using Color-size Features of Watershed Regions," In Proceeding of Journal of Visual Communications and Image Representation, vol. 20, Issue 3, Jan. 27, 2099, 11 pages.
Wong, et al., "A Non-linear and Non-Iterative noise Reduction Technique for Medical Images: Concept and Methods Comparision," In Proceedings of international Congress Series, vol. 1268, Jun. 2004, 6 pages.
Tabb. et al., "Multiple Image Segmentation by Integrated Edge and Region Detection," In IEEE Transactions on Image Processing, vol. 6, Issue 5, May 1997, 14 pages.
Garcia, et al., "A Scale-vector Approach for Edge Detection," In Journal of Pattern Recognition Letters, vol. 16, Issue 6, Jun. 1995, 10 pages.
Charles McLeod, "Image Processing," Retrieved on: May 26, 2011 Available at: http://me.queensu.ca/people/sellens/research/sprayFlow/mcleod/research/imagepro.htm#Top.

* cited by examiner

*Primary Examiner* — Michelle Entezari
(74) *Attorney, Agent, or Firm* — Aaron Chatterjee; Peter Taylor; Micky Minhas

(57) ABSTRACT

In various embodiments, systems and methods are provided for using an expanded image format to facilitate image transformations. The expanded image format can include at least a first set of boundaries and a second set of boundaries. The first set of boundaries corresponds to the image for transform, while the second set of boundaries provide a region beyond the image that can assist a graphics processing unit with performing a transform. Optionally, the expanded information can also include pixel value information for pixels in the region between the image boundary and the overboundary.

15 Claims, 9 Drawing Sheets

IMAGE PROCESSING USING BOUNDS ADJUSTMENT

BACKGROUND

Rendering of graphics for display is a common activity on a wide variety of computing devices. The increase in available processing power in recent years has created an expectation from users that even trivial applications will display polished and attractive graphics. In order to handle the graphics processing requirements, many computing devices include a separate graphics processing unit (GPU). A separate GPU allows the primary processing unit(s) to focus on other activities, while the GPU can handle the specialized activities related to rendering images.

One of the activities performed by graphics processing units is transforming images. Image transformation generally includes a variety of activities such as rotating an image or providing an effect for the image, such as a blur effect. A GPU can receive an initial image specification, perform a desired transform, and then return information corresponding to a transformed image that allows the transformed image to be drawn or displayed on a display screen.

SUMMARY

In various embodiments, systems and methods are provided for using an expanded image format to facilitate image transformations. The expanded image format can include at least a first set of boundaries and a second set of boundaries. The first set of boundaries corresponds to the image for transform, while the second set of boundaries provide a region beyond the image that can assist a graphics processing unit with performing a transform. Optionally, the expanded information can also include pixel value information for pixels in the region between the image boundary and the overboundary.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
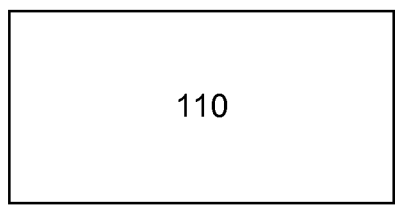
FIG. 1 shows an example of an image divided into image portions.
Figure 1:
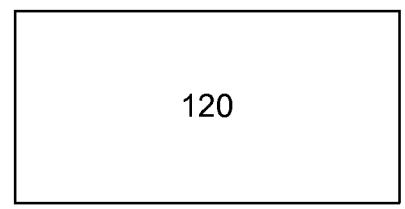
Figure 1:
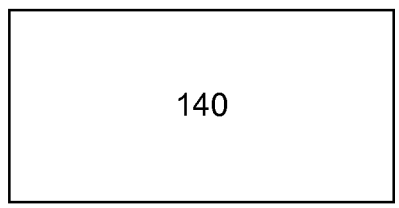
Figure 1:
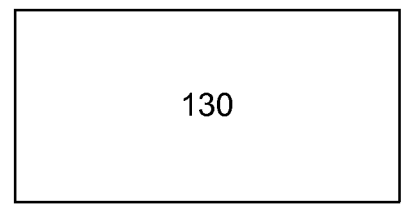
Figure 1:
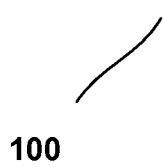

In various embodiments, systems and methods are provided for transforming images using a graphics processing unit. When image information is passed into a graphic processing unit for performing a transform, at least two sets of boundary information are provided for the image. One set of boundary information provides information about the image (or portion of an image) that is desired for display. A second set of boundary information provides information about a larger boundary. The larger boundary can represent information provided to the GPU that includes a gutter or other additional surrounding pixel information for potential use in performing a transform on the desired image. Additionally or alternately, the larger boundary can provide information indicating that the image being provided to the GPU is part of a larger overall image, and that transforms such as rotations should be performed based on the larger overall image boundary, as opposed to the boundary for the image portion passed to the GPU.

In this document, images (or portions of images) are described with reference to several types of data. One type of data is the boundaries for an image or image portion. This defines the bounds or shape of the display area represented by image data. The boundaries optionally also provide a default image size for display, although various scaling techniques can alter a typical image to allow for display of a variety of image sizes.

A second type of data for an image is the pixel value data for an image. The pixel value data is a specification of the display value for all of the pixels within the boundaries of an image. One example of pixel value data can be to provide a red, green, and blue color value for a pixel, such as a numerical value between 0 and 255 for each of the colors. Another example of pixel value data can be to provide a value indicating the transparency of the pixel, such as an alpha value. Such a value can be used in conjunction with color values for a pixel to provide a greater variety of pixel values. More generally, pixel value data can correspond to any type of data that provides information that defines how to display the pixel.

A third type of data for an image can be a data format for the image. The data format information allows a graphics transformation application and/or a GPU to know what type of boundary and pixel value information is being provided and how to interpret such information. In some embodiments, the data format information can be a reference to a standard format, such as JPEG or BMP. In other embodiments, the data format may not have to be explicitly provided. This can be due to the graphics transformation application and/or GPU expecting a data format, or due to the ability of the application or GPU to detect the format automatically.

In addition to specifying a standard data format for pixels, the image format information can also include a description of the type of pixel values used for the additional pixels. For example, an overboundary may be added to an image. An overboundary corresponds to a boundary that is outside of or beyond the limits of the image boundary. Additional pixels can be located between the image boundary and the overboundary. The pixel values for the additional pixels can be assigned based on a pixel value scheme, such as assigning all additional pixels a transparent black value or assigning all additional pixels a pixel value corresponding to the nearest pixel located within the image boundary. When the pixel values for additional pixels are assigned based on a pixel value scheme, the nature of the pixel value scheme can be included as part of the image format data. Thus, a GPU that receives the image does not have to detect that all of the additional pixel values between the image boundary and the overboundary correspond to a transparent black pixel value. Instead, the GPU can use the image format information to determine that this assignment has been made. This can assist the GPU in determining whether the overboundary and additional pixels provided with an image are suitable for use in performing a desired transform.

To facilitate explanation of various embodiments of the invention, image data information will be described with reference to image boundary data or information, pixel value data or information, and format data or information. Some references may be made to passing these types of information as parameters. It is noted that any convenient method for providing information may be used, and that the choice of representing information as image boundary data, pixel value data, and format data is for convenience only. For example, it may be desirable to provide pixel values as a series of parameters, such as by providing separate parameters for each color channel of a pixel. Another option may be to pass all image data as a single parameter, as opposed to providing boundary data and pixel value data as separate parameters. More generally, any other convenient format for providing such data may be used. Additionally, the data corresponding to an image may include additional parameters, such as optional parameters described below or other types of information not explicitly described herein.

In this discussion, reference will be made to performing transforms using an application, such as an application running on a graphics processing unit or GPU. Those of skill in the art will understand that a transform performed on a GPU can alternately be performed on a processor other than a GPU using an application. For convenience, this discussion will describe the invention in relation to performing transforms using a GPU. However, this choice is for convenience only, and it is understood that other convenient ways for performing a transform can also be used unless otherwise specified.

Image Boundaries and Transformations

A graphics transformation application typically performs image transforms using a standard application programming interface (API) with a library of image transform routines. Examples of application programming interfaces for performing image transformations include Direct2D (an API incorporated into various versions of Windows®) and Core Image (an Apple® API). In many situations, a graphics transformation application will run on a central processing unit and send forward appropriate graphics operations to a GPU. When image data is provided to an application or GPU for transformation, conventionally an application or GPU can receive boundaries for an image, pixel data for the image, and a format for the pixel and/or boundary data. For some types of transforms, this image data is sufficient for the application or GPU to perform the transform. For example, many types of transforms represent one-to-one transforms of pixel values. In a one-to-one transform, each pixel is mapped to another pixel. A one-to-one transform is in contrast to a transform where pixel values from more than one pixel in an original image are needed to determine the pixel values for a pixel in the final image.

In other types of transforms, such as blurring of an image, there is not a one-to-one correlation of pixels prior to the transform and pixels after the transform. Instead, a pixel for display after the transform operation is based on pixel values from two or more pixels of the original image data. For example, a pixel value in the transformed image can represent a weighted average of a plurality of pixel values from the image prior to transform. Unfortunately, transformations of image data that involve blending information from multiple pixels can pose challenges at the boundary of an image. At the boundary, some pixels will have a reduced number of neighboring pixels. As a result, a transform that blends pixel values from a plurality of pixels may be undefined or poorly defined near the edge of an image based solely on the pixel values contained in the image.

When a pixel value from beyond the edge of an image is needed, some graphics processing units have the ability to sample from beyond the edge of the image. However, the results of such sampling vary depending on the GPU. Some graphics processing units can sample outside an image boundary by assigning a pixel value corresponding to the closest pixel that is within the boundary. Alternatively, an image may be part of an atlas of images. An atlas of image portions allows various images in the atlas to be arranged and/or rearranged as needed. If an image is part of an atlas of images, the GPU may return a pixel value from an adjacent image, regardless of whether that adjacent image is related to the current transform. Still other graphics processing units lack the ability to sample beyond the image boundary. As a result, performing a transform that requires pixels from beyond the edge of an image can potentially lead to inconsistent behavior across various types of processors. One method for overcoming this difficulty in performing a transform is to add pixels corresponding to additional pixel value information around an image. These additional pixels are sometimes referred to as a "gutter" of pixels or pixel information around an image. The additional pixel values are added to the image for the purpose of allowing the transform to occur in a well-defined manner. This results in a new image with larger boundaries that includes the gutter information. For example, consider a transform that requires averaging of five pixel values within a given row of pixels, such as pixel values for a central pixel and two pixels on either side. At the image boundary, the transform is difficult to perform because two additional pixels are needed beyond the edge of the image. To overcome this difficulty, a gutter of additional pixel values can be added as a border around the image. Because the transform potentially needs two additional pixel values, the gutter added by the GPU can be two pixels beyond the original image boundary. This results in a new image with two additional pixel values added beyond the edge of the original boundary in all directions.

The pixel values for these additional pixels can be selected as any convenient values for performing a transform. For example, one convenient choice can be to assign a "transparent black" value to the additional pixels. For a pixel that is specified based on three color channels and a transparency value, a transparent black pixel can have a zero value for each of the color channels, corresponding to a black color. Additionally, the transparency value can be set to zero so that the pixel is completely transparent. During a transform, when a transparent black pixel value is used in a weighted average with other pixel values, the transparent black pixel value will not introduce a color artifact into the transformation. The overall intensity of the transformed pixel value may be reduced, but the color of the transformed pixel based on the pixel values from the original image will be preserved. Another convenient choice can be to assign pixel values for the additional pixels that correspond to the pixel value of the nearest pixel that resides within the boundaries of the image.

While the above method for adding pixels or pixel values to an image for a transform is effective, the above method also reduces the speed for performing a transform and requires an increase in the amount of memory used to perform a transform. Using the above method, a GPU will be forced to create up to twice as many images when performing a transform. When only a single image is being transformed, a first image created by the GPU will correspond to the image with the additional transparent black gutter. The second image will correspond to the transformed image that is desired as the output. In situations where multiple images that are part of a single final texture are being transformed, the number of additional images may not be exactly a factor of two greater. It is also noted that the above method for adding a transparent black gutter is specific to performing a given transform. After the transform is finished, the modified image with the transparent black gutter is either discarded immediately, or held in a temporary memory cache. If another transform is performed on the same original image, or if such a transform is performed after the temporary memory cache has been cleared, the process for adding a gutter to the image will be repeated, once again resulting in the creation of more than one image per final generated output image.

Providing Images with Expanded Information

In various embodiments, the additional time required to produce additional images with gutter information can be avoided. This can be achieved by providing image information to the GPU in a different format. In the above comparative example, image information was provided to the GPU in the form of an image boundary, pixel values for pixels residing within the image boundary, and optional data format information. In an embodiment, an expanded set of information can be provided to the GPU when an image is provided for processing by the GPU.

The expanded information provided to the GPU can include at least two sets of boundary information. One set of boundary information can correspond to the boundaries for the image data to be processed by the GPU. This boundary information roughly corresponds to the image boundary provided in the above comparative example. The second set of boundary information corresponds to a larger set of boundaries. Preferably, the scope of the boundary for the image data (the first set of boundary information) is contained within the scope of the second boundary. In this document, a first boundary being contained within a second boundary is explicitly defined to include the situation where a portion of the first boundary is identical to or co-linear with the second boundary. For example, if the first boundary defines an image portion of a larger image corresponding to a second boundary, at least a portion of the first boundary and second boundary may be along the same line or otherwise in the same location(s). The second set of boundary information can sometimes be referred to as an overboundary. In some embodiments, the expanded information provided to the GPU can also include an additional plurality of pixel values. Optionally, the expanded information can include a data format for the overboundary and/or the pixel information that resides between the image boundary and the overboundary. Although the additional pixels between an image boundary and an overboundary will often have the same format as the image pixels, this is not required. Similarly, the format of the information that defines the overboundary does not necessarily have to be the same as the format for the image boundary. Thus, in some embodiments the format of the pixel values between the image boundary and the overboundary and/or the format of the boundary information for the overboundary may be specified.

The second set of boundary information, which preferably defines a larger boundary than the boundary for the image data, can be used in a variety of ways. In an embodiment, the larger boundary (or overboundary) can be used to define a gutter that contains additional pixels. The additional pixel values for pixels that reside between the image boundary and the overboundary are not part of the image being transformed, but the additional pixel values can be used to assist in transforming the image. In other words, the additional pixel values correspond to pixels that will not be displayed when the GPU provides the output image to the primary processors for display. However, the additional pixel values can be used for the transform of the pixels within the image boundary.

The number of additional pixel values for pixels located between the image boundary and the overboundary can be any desired amount. In some embodiments, after receiving the image boundary and the overboundary, the GPU can calculate one or more quantities related to the number of additional pixels or pixel values between the image boundary and the overboundary. For example, in a data format where pixels are arranged in rows and columns, the number of additional pixel values present in a given column and/or in each column can be determined. A similar calculation could also be made for the rows. This allows the GPU to determine whether the pixel values for pixels between the image boundary and the overboundary are sufficient to perform a transform that has been requested.

In various embodiments, the number of pixels between the image boundary and the overboundary can be determined based on the information related to the overboundary provided in the expanded information. This means that the edge of the image does not have to be detected in order to distinguish the image boundary from the overboundary. The calculated number of pixels can represent the total number of pixels located between the image boundary and the overboundary, a number of pixels within a row or column that are located between the image boundary and the overboundary, or another convenient value. Optionally, the calculation of pixels between the image boundary and the overboundary may be based on an image format. The image format can be an image format specified for the pixels between the image boundary and overboundary in the expanded information. Another possibility is that the image format can be selected based on a format for the pixels within the image boundary. Still another option is that the image format can be automatically detected.

Specifying an overboundary in the expanded information also provides flexibility for an image transform application. Various processes may have different needs for additional pixel information. Some processes may only need one or two additional pixel values outside an image boundary, while other processes may require 10 or more additional pixel values. Instead of requiring images to have a fixed overboundary, each process or application that accesses the GPU can specify an overboundary that matches the needs of the process or application. When a GPU is performing transforms for multiple images or image portions, the various images or image portions do not all have to use the same size overboundary and/or the same number of additional pixel values between the image boundary and the overboundary. Even if two images for transform have the same number of pixel values within the image boundary, the number of pixel values between the image boundary and the overboundary can be different.

The expanded information can be used to assign any convenient pixel values to the additional pixels between the image boundary and the overboundary. For example, the expanded information can specify that the additional pixels all have a pixel value selected from one or a few default values, such specifying that all of the pixels have the color values and transparency values for transparent black.

Alternatively, the additional pixel values can contain other image information. For example, consider a situation where the image provided to the GPU for transform represents a portion of a larger image. In this discussion, when a portion of an image is provided to a GPU, the larger image that the image portion is extracted from can be referred to as a parent image. The portion of the image provided to the GPU may be the only portion that is transformed, or the GPU may be transforming the full parent image in portions. When a portion of the image is provided to the GPU, the image information beyond the boundaries of the image portion is potentially known, as it may be present in the parent image. If desired, the pixel values for at least a portion of the pixels located between the image boundary and the overboundary can be assigned based on pixel values for corresponding pixels in the parent image. However, it may be more convenient to assign a pixel value such as transparent black, so that allocation and evaluation of the pixels from the parent image is unnecessary. Additionally, the larger image corresponding to the image portion may not exist and/or may not be readily available, which would also make it more convenient to assign pixel values not related to the parent image.

As noted above, the expanded information can be used to allow the GPU to determine the number of additional pixels or pixel values that are available for use during an image transform. If a desired transform requires a number of pixel values that is less than or equal to the number of additional pixel values between the image boundary and the overboundary, the expanded image information can be used for performing the transform. This allows the GPU to avoid the step of creating a preliminary image with a gutter of transparent black pixels. If the number of additional pixels is not sufficient, the GPU can create a preliminary image with additional gutter to accommodate the requirements of the transform. Similarly, if expanded information containing additional pixel values is not provided with an image, the GPU can also create preliminary images with additional gutter as needed.

Providing expanded information to a GPU can allow for substantial time savings during processing by a GPU. Although the expanded information is added by another processor, in many situations addition of the expanded information by another processor will be more efficient than having the GPU add or create the expanded information. Additionally, in some embodiments the addition of the expanded information by another processor can occur in parallel with another limiting process, allowing the expanded information to be added without an apparent cost in time. For example, when an image is loaded or saved to disk, the speed of the read or write from the disk (or other longer term storage medium) to the memory used by a processor will typically be slow relative to a process operating on data that is already in memory. Thus, if the expanded information is added to an image during the time when the image is being loaded from disk, the addition of the expanded information may appear to take little or no time, as the addition can largely be completed during the disk read operation. Additionally, if the expanded information is saved with an image, the expanded information will only need to be added once. This is in contrast to a conventional GPU, which would be forced to add a gutter of transparent black pixels to an image each time a transform is performed.

Additional Expanded Information Formats

In various embodiments, the expanded information can be used in other situations. Another example for use of expanded information is when performing a rotation transform of image data. A rotation transform of an image typically involves the concept of a rotating an image relative to a rotational axis. For a GPU that only has information about the image being rotated, the rotational axis will typically be selected as a location within the image. While this is effective for performing a rotation, the selection of a location within the image as the rotational axis limits the types of rotational transformations that can be performed. In particular, if the image being rotated is a portion of a larger parent image, the desired axis of rotation may be located outside of the image portion being rotated.

Providing expanded information for an image that is being transformed can overcome this difficulty. In this situation, when an image is provided to a GPU, a first set of boundary information corresponding to the image can be provided, along with pixel information and optional format information. A second set of boundary information corresponding to an overboundary can also be provided. The boundaries defined by the second set of boundary information can contain the first set of boundaries corresponding to the image portion. The second set of boundary information can represent, for example, the concept that the image portion being transformed belongs to a larger parent image. Providing the second set of boundary information allows the rotational transform to be performed using a rotational axis selected from within the overboundary. This can simplify a rotation of a large (parent) image when the large image is rotated by transforming image portions. If only conventional information is provided for each image portion, some method is needed for specifying the rotational axis relative to each image portion. When expanded information is provided for each image portion, since the rotation is being performed relative to a location within the larger image, the same overboundary can be provided for each image portion, which allows the same axis of rotation to also be specified for each image portion.

Another variation on expanded image formats is the use of expanded image formats when images are stored and transformed as portions of a larger or parent image. One technique for storing larger images as a group of smaller image portions is "atlasing". An atlas of image portions allows various images in the atlas to be arranged and/or rearranged as needed. These atlas images can also be transformed in various ways.

In an atlas, the images can be stored with expanded information, such as a second set of boundary information to define an overboundary and pixel information for pixels located between the image boundary and the overboundary. Instead of adding a gutter of pixels each time an atlas image portion is transformed, an atlas image can be stored with expanded information. When the atlas image is retrieved, the expanded information is retrieved as well. This allows a transform of the atlas image to be performed without having to generate a preliminary image that adds a gutter.

Another example of transforms on image portions relates to tile based rendering graphic processing units. The Intel® GMA 500 is an example of a tile based rendering GPU. A tile based rendering GPU will render only a portion of a texture at time. The portions of textures can be provided to the tile based rendering GPU with expanded information to avoid the need for generating a preliminary image or texture with a gutter prior to generating a transformed image or texture.

In still another example, an image can be provided with additional information that corresponds to multiple boundaries. A first boundary can be a boundary that corresponds to the image itself. This boundary defines the region which contains pixels with image information that should be evaluated during a transform. One or more additional boundaries, such as a second boundary and a third boundary, correspond to overboundaries that can be used for any convenient purpose. For example, the second boundary can expand the image by a small amount using pixels that have pixels values corresponding to the nearest neighbor pixel that resides within the image. The third still larger boundary can be a boundary intended for facilitating rotations of an image. The pixel values between the second and third boundary can also be based on a pixel scheme using a nearest neighbor pixel value, or a different scheme can be used such as transparent black pixels.

In some situations, a series of transformation will be performed on an image, such as multiple effects that correspond to a connected effect graph. Each of the transforms in the connected effect graph may not require all of the specified boundaries. However, the additional boundaries can still be passed through the connected effect graph in parallel, for use in later transforms.

When one or more overboundaries are present, in some embodiments a GPU can select the appropriate boundary to use for a given transform. For example, an effect processing system will often include an extensibility mechanism. The extensibility mechanism allows users to author a plug-in module with custom transform effects. An effect processing system could include a definition that each specified boundary has a different meaning. For example, effect processing system could include a definition that the first boundary specified for an image corresponds to the boundary for the image information. When a second boundary is specified, the second boundary corresponds to additional pixels for assisting with a first type of transform, such as blur transforms or other pixel averaging transforms. When a third boundary is specified, the third boundary information will be used for another type of transform, such as rotational transforms. When the additional boundaries are not specified, the image boundary is used. Based on such definitions, an author of a plug-in extension would not need to specify the boundary to use when creating transforms in the plug-in. Instead, the effects processing system would consume the abstracted rendering steps defined by the plug-in author and determine the appropriate boundary to use at each step. This would allow the plug-in author to create the plug-in extension without worrying about specifying the various boundaries that might be required for each transformation in the plug-in extension.
Example of Image Transform In this example, an application is running on central processing unit of a computing device that includes a display device, such as a display screen. The computing device also includes a graphics processing unit. During operation of the application, the application identifies and/or produces image information for display on the display device. However, one or more transform operations on the image information are needed prior to display.

As an initial action, the image information is divided into four portions. If it is desirable to transform the full image, the transform will occur by transforming the four portions and combining the transformed images. This could be a choice of convenience for the application, a choice based on a memory requirement, a choice based on a requirement for the GPU, or for any other reason. FIG. 1 shows a representation of a parent image 100 divided into image portions 110, 120, 130, and 140. In FIG. 1, image portions 110, 120, 130, and 140 are shown as being separated. However, during display of the full image, the image portions would be displayed without the gap, resulting in a continuous image. As a result, pixels at the right edge of image portion 110 will be adjacent to pixels from the left edge of image portion 120. Similarly, pixels from the bottom edge of image portion 110 will be adjacent to pixels from the top edge of image portion 140.

Another initial action is to create additional pixel values as a gutter surrounding each of the four image portions. The additional pixels extend the pixel rows and pixel columns for each of the image portions by a total of six pixel values. This corresponds to three added pixel values on each side of the image portions. The choice of six additional pixel values for the pixel rows and columns of the image portions is based on the typical needs of the application requesting the image transform. Other applications might need fewer pixels for typically requested transforms, and could therefore add only two additional pixel values to each row and column, or at least two pixels, or at least four pixels. Still other applications might need more pixels for typical transformations, and could therefore add at least ten pixel values, or at least twenty pixel values. Yet another option could be to add a different number of pixel values to the rows as compared to the columns, if that is beneficial for a transform. In still another option, the pixels may be arranged in a manner other than based on rows and columns. In this type of option, any other convenient choice for adding pixels can be used that provides a desired amount of additional pixels for use during image transform operations.

Figure 2:
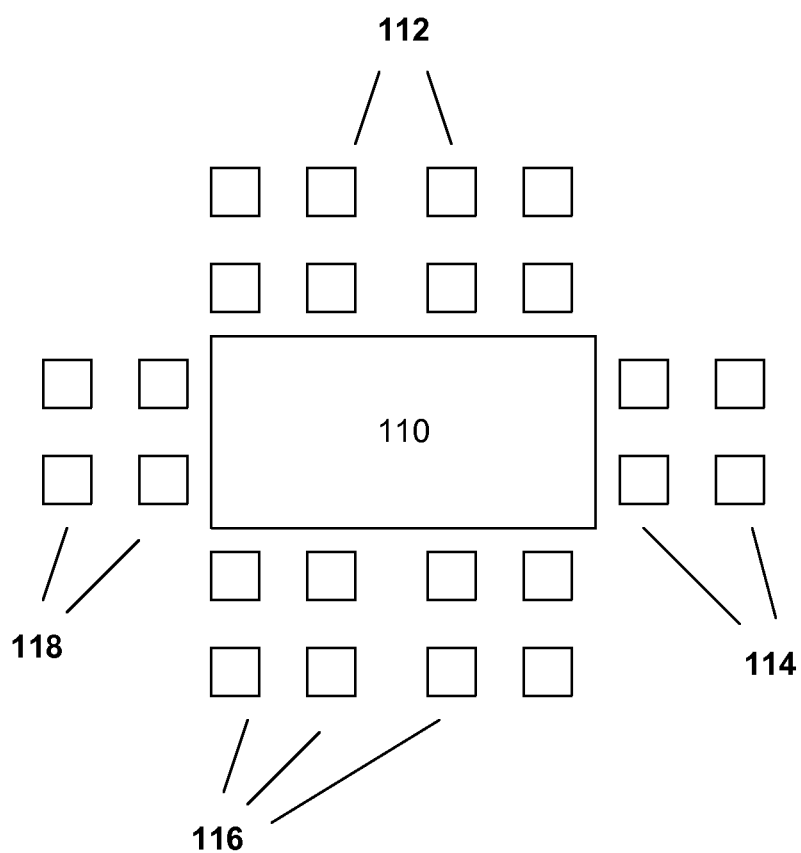
FIG. 2 shows an example of an image with additional pixels.

FIG. 2 shows an example of adding additional pixels to an image portion. In FIG. 2, additional pixels are shown for image portion 110. Additional pixels 112 and 118 represent pixels added in an area where parent image 100 had no information. Additional pixels 114 represent pixels that correspond to the location of image portion 120 in FIG. 1. Additional pixels 116 represent pixels that correspond to the location of image portion 140 in FIG. 1. Although the additional pixels 112, 114, 116, and 118 are schematically shown in FIG. 2 as being large relative to the image portion 110 for convenience in illustrating the concept, it is understood that the scales are not representative, and that image portion 110 can represent any convenient number of pixels.

The pixel values of the additional pixels vary depending on the location of the pixels. In the example shown in FIG. 2, because additional pixels 112 and 118 do not overlap with another image portion of parent image 100, additional pixels 112 and 118 are assigned a pixel value of transparent black. Additional pixels 114 are assigned pixel values that match the pixel values for the corresponding pixel positions in image portion 120. Similarly, additional pixels 116 are assigned pixel values that match the pixel values for the corresponding pixel positions in image portion 140. In other types of embodiments, all of pixels 112, 114, 116, and 118 could receive one or more default pixel values, such as transparent black.

It is noted that the actions of dividing an image into portions and/or creating additional pixels can be performed at any convenient time. These actions can be performed as a precursor to providing the image portions to the GPU for performing the image transform. Alternatively, the image can be divided into portions and the additional pixels can be created in advance. The image portions with the additional pixels can then be stored until needed.

Figure 3:
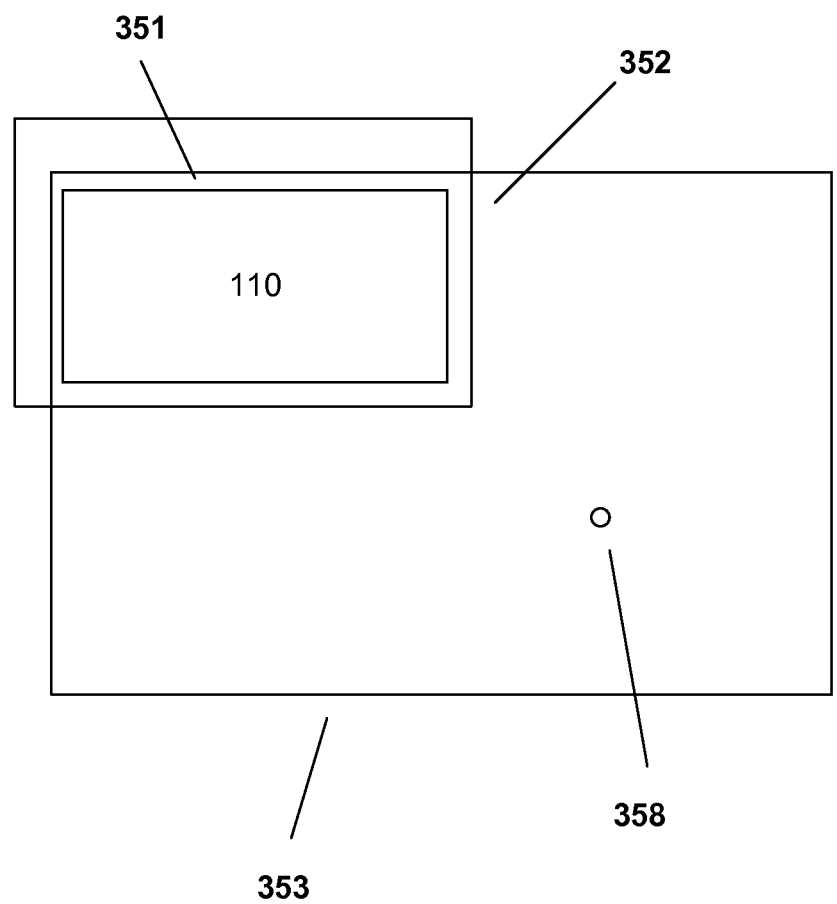
FIG. 3 shows an example of various boundaries and/or overboundaries for an image.

The image portions can then be transformed. This example will continue to focus on image portion 110. The image portion 110 is provided to the GPU for performing the image transform. When the image portion 110 is provided, the information for the image includes three types of boundaries, as shown in FIG. 3. The first boundary 351 corresponds to the boundary for the image portion 110. Image boundary 351 contains the pixels that will eventually be displayed after one or more transform operations. The second boundary 352 corresponds to a first overboundary. The area between the image boundary and the first overboundary corresponds to an area containing additional pixels for facilitating a transform, such as additional pixels 112, 114, 116, and 118. By specifying both first boundary 351 and second boundary 352, the GPU does not need to detect the edge of the image relative to the gutter. Instead, the GPU can identify the pixels that reside between the image boundary 351 and second boundary 352 based on the provided information. The third boundary 353 is a boundary that corresponds to the full size of the parent image 100 from FIG. 1. This corresponds to a second overboundary. The third boundary can be useful in performing rotational transforms of the image portion 110 based on a location contained within the bounds of parent image 100, such as rotation point 358. It is noted that in some embodiments, the expanded information provided to a GPU may only include one overboundary. In such embodiments, the purpose of the overboundary can be determined based on the type of transform requested, whether additional pixel values are present, or by any other convenient method.

In FIG. 3, it is noted that the first boundary 351 and third boundary 353 do not share a common boundary line. However, this choice was made for convenience in demonstrating the concept. Since third boundary 353 in FIG. 3 represents a parent image while first boundary 351 represents an image portion, in many situations first boundary 351 and third boundary 353 would be in the same location(s) for at least a portion of the boundaries. Because second boundary 352 represents a boundary for additional pixel values beyond the edge of the image, part of the boundary for second boundary 352 is shown as being outside of both first boundary 351 and third boundary 353.

Figure 4:
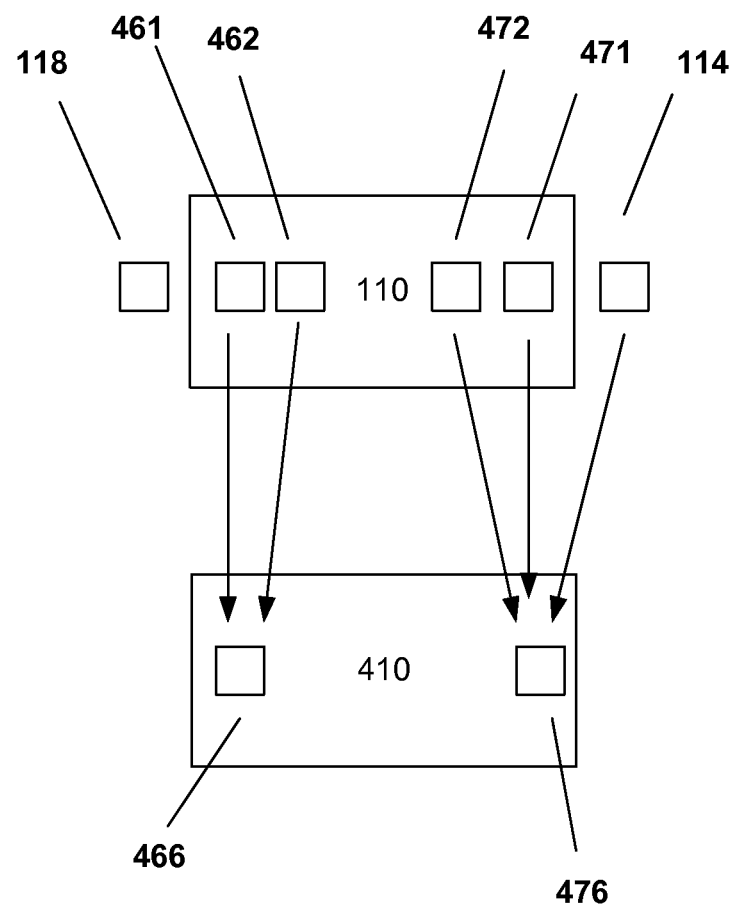
FIGS. 4 and 5 schematically show examples of transforming an image.

FIG. 4 shows an example of performing a transform on the image portion 110. In this example, the transform involves averaging the pixel values within a row for a central pixel and one neighboring pixel on either side. Other transforms can blend pixel values from pixels in the same column, or the pixels from blending can include pixels from multiple rows and/or columns. In FIG. 4, an example of performing the transform is shown for pixels on the left edge and right edge of image portion 110. For the pixel on the left edge 461, the transform will result in a pixel 466 that is part of a transformed image portion 410. The transformed pixel 466 is a combination of the pixel values for pixel 461, the pixel 462 to the right of the pixel, and pixel 118 to the left of the pixel. Because the pixel 118 has a transparent black pixel value, pixel 118 does not contribute to the final pixel value for pixel 466. Instead, pixel 466 is just a combination of the pixel values for pixel 461 and the pixel 462 to the right. By contrast, for the pixel on the right edge 471 of image portion 110, three pixel values contributed to transformed pixel 476. Pixel 472 to the left of pixel 471 contributes to the pixel value of pixel 476. Pixel 114 also contributes, based on a pixel value from the corresponding pixels in image portion 120.

Figure 5:
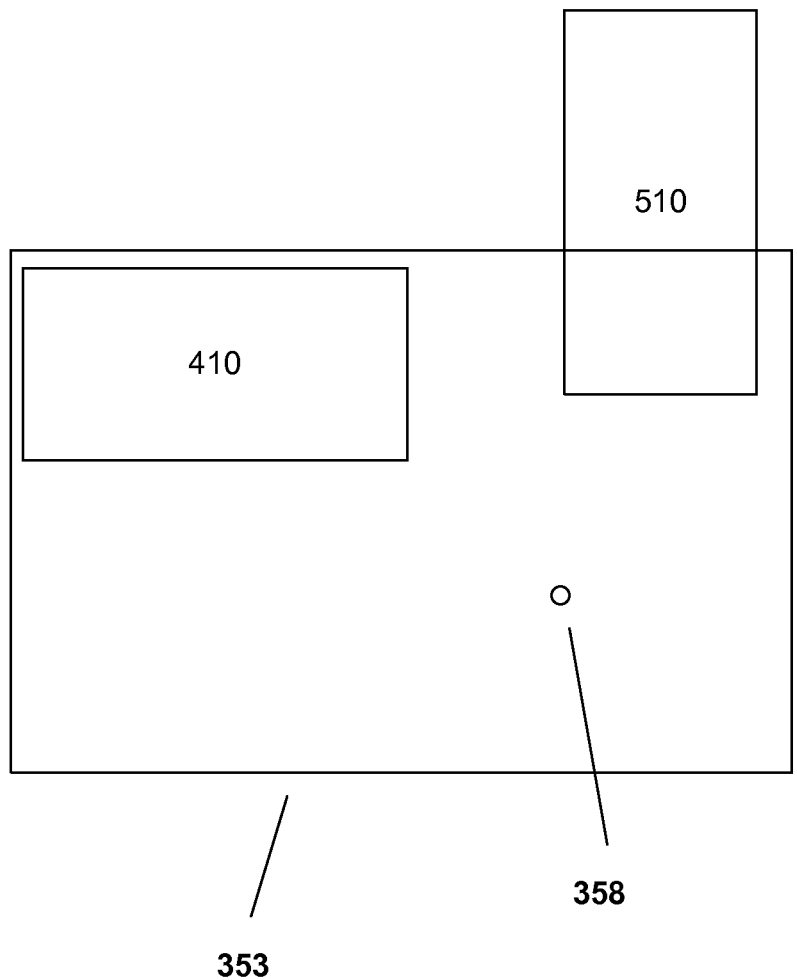

After the transform to form image portion 410, the image portion 410 is then rotated clockwise by 90 degrees using image point 358 as the axis of rotation to produce image portion 510, as shown in FIG. 5. In some conventional transform applications, image point 358 would be difficult to specify, as the image point 358 is not within the bounds of image portion 410. However, image point 358 is within the bounds of third boundary 353. Specifying the boundary 353 for use in performing rotational transforms provides a larger boundary so that the application or GPU performing the transform is aware of a boundary that contains the desired rotational point. After performing the rotational transform, the GPU returns the transformed image portion 510 for display on the display device.

Additional Examples

Having briefly described an overview of various embodiments of the invention, an exemplary operating environment suitable for performing the invention is now described. Referring to the drawings in general, and initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

Figure 6:
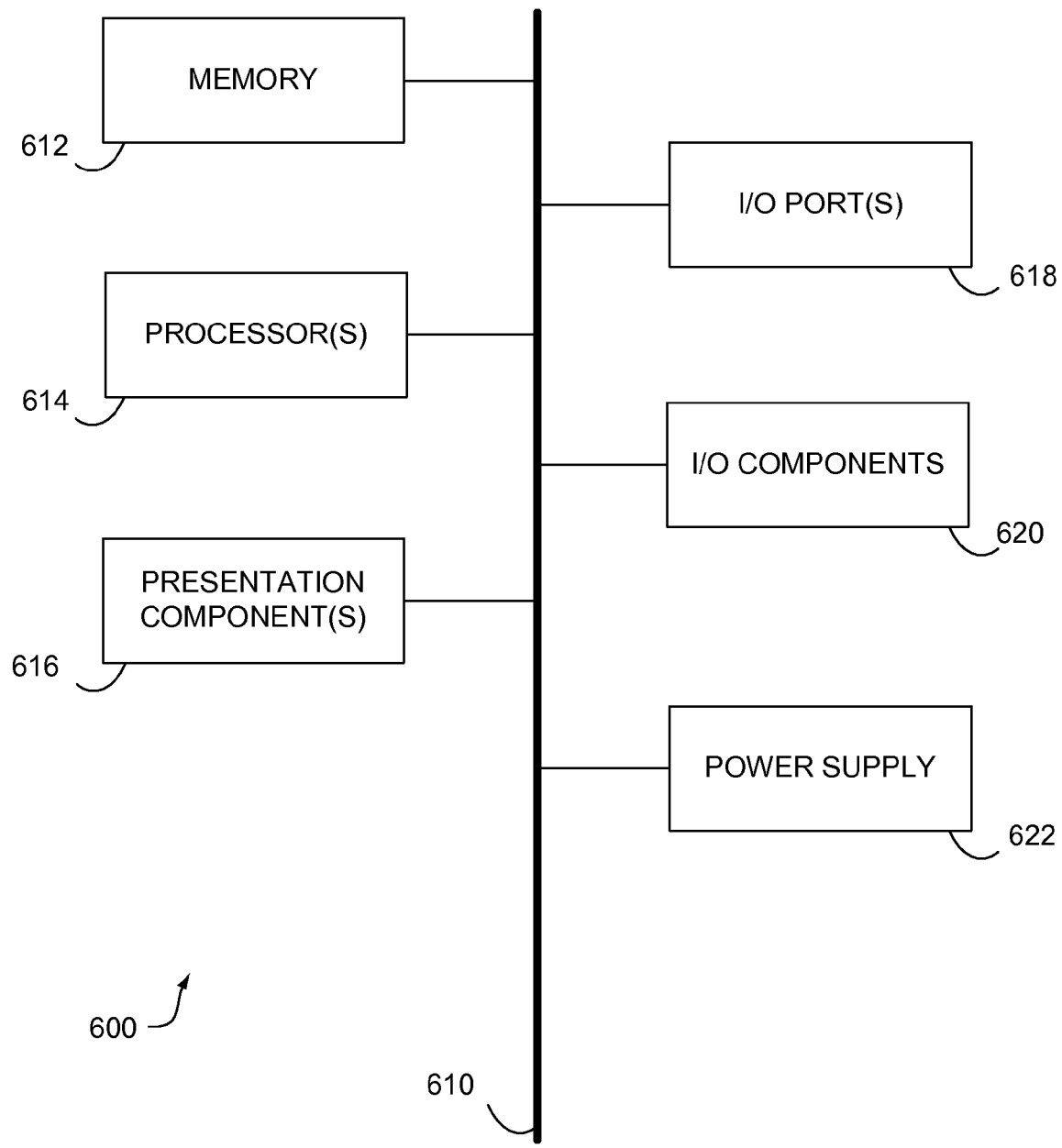
FIG. 6 schematically shows an example of a computing device suitable for use in performing image transforms.

With continued reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

The computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 600. In an embodiment, the computer storage media can be selected from tangible computer storage media. In another embodiment, the computer storage media can be selected from non-transitory computer storage media.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The memory 612 can include computer-storage media in the form of volatile and/or nonvolatile memory. The memory may be removable, non-removable, or a combination thereof. Exemplary hardware devices include solid-state memory, hard drives, optical-disc drives, etc. The computing device 600 includes one or more processors 614 that read data from various entities such as the memory 612 or the I/O components 620. The one or more processors can include one or more central processing units as well as one or more graphics processing units. The presentation component(s) 616 present data indications to a user or other device. Exemplary presentation components include a display device, speaker, printing component, vibrating component, and the like.

The I/O ports 618 can allow the computing device 600 to be logically coupled to other devices including the I/O components 620, some of which may be built in. Illustrative components can include a microphone, joystick, game pad, satellite dish, scanner, printer, wireless device, etc.

Figure 7:
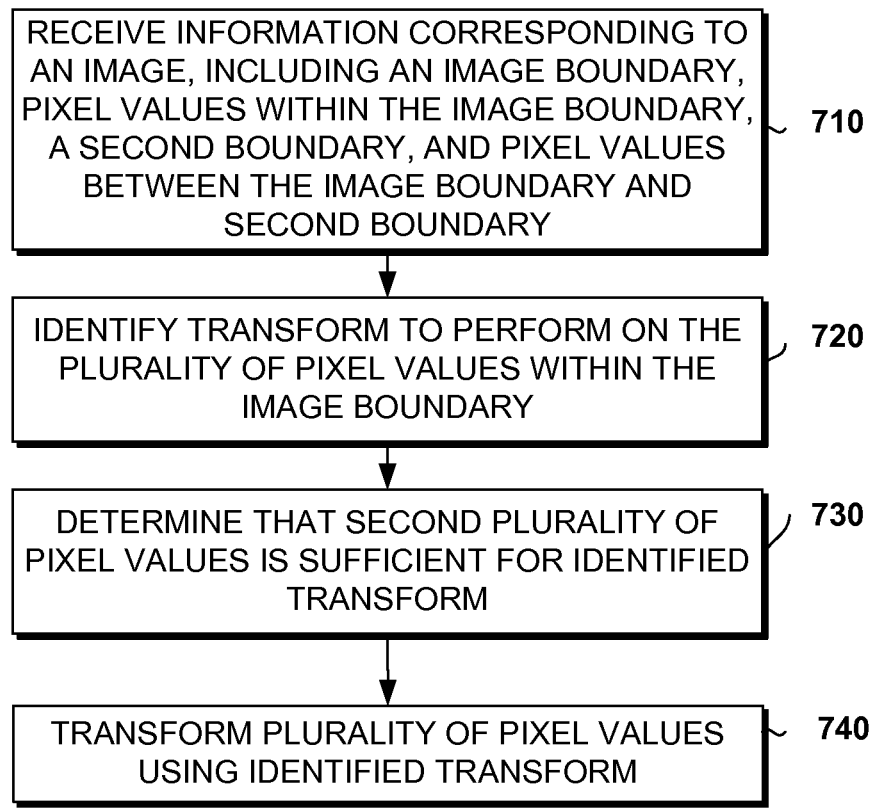
FIGS. 7-9 show examples of transform methods.

FIG. 7 shows an example of a method according to the invention. In FIG. 7, information is received 710 that corresponds to an image. The image information includes an image boundary and a first plurality of pixel values for pixels located within the image boundary. The image information also includes a second boundary and a second plurality of pixel values for pixels located between the image boundary and the second boundary. Preferably, the image boundary is contained within the second boundary. A transform is identified 720 that is to be performed on the plurality of pixel values within the image boundary. Preferably, the identified transform corresponds to a transform that is not a one-to-one transform of pixel values between the initial image and the transformed image. A determination 730 is then made to determine that the second plurality of pixel values is sufficient to perform the identified transform. The sufficiency of the second plurality of pixel values is based on whether the transform is well-defined for all pixel values within the image boundary. The plurality of pixel values within the image boundary is then transformed 740.

Figure 8:
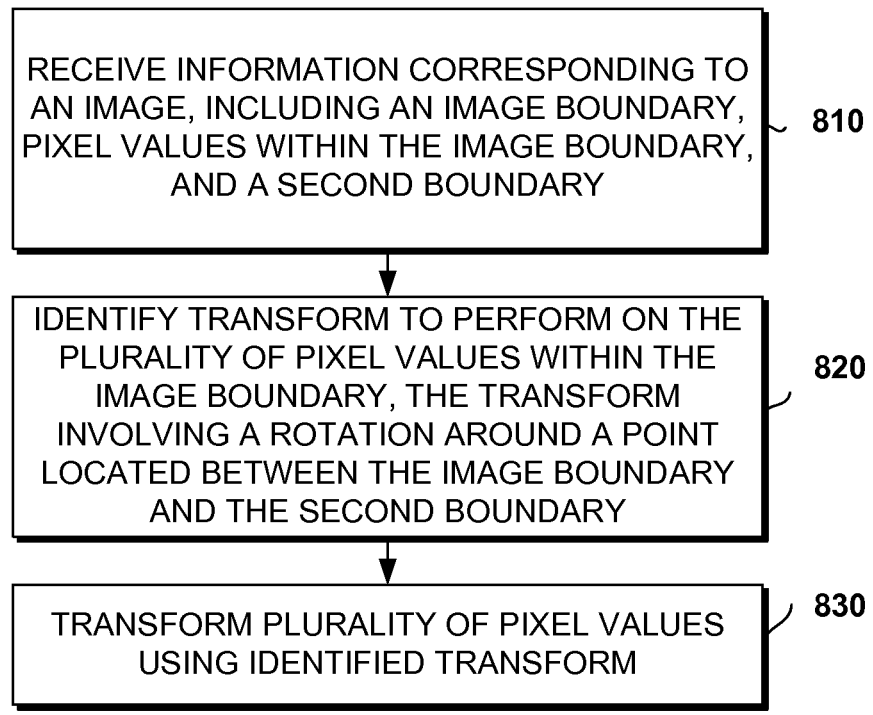

FIG. 8 shows another example of a method according to the invention. In FIG. 8, information is received 810 that corresponds to an image. The image information includes an image boundary and a first plurality of pixel values for pixels located within the image boundary. The image information also includes a second boundary. Preferably, the image boundary is contained within the second boundary. A transform is identified 820 that is to be performed on the plurality of pixel values within the image boundary. Preferably, the identified transform involves a rotation around a point located between the image boundary and the second boundary. For a rotational transform that mimics a rotation in three dimensions (as opposed to a rotation just in the plane of a display screen), the point located between the image boundary and the second boundary can optionally be converted into a line to define the axis of rotation. The plurality of pixel values within the image boundary is then transformed 830.

Figure 9:
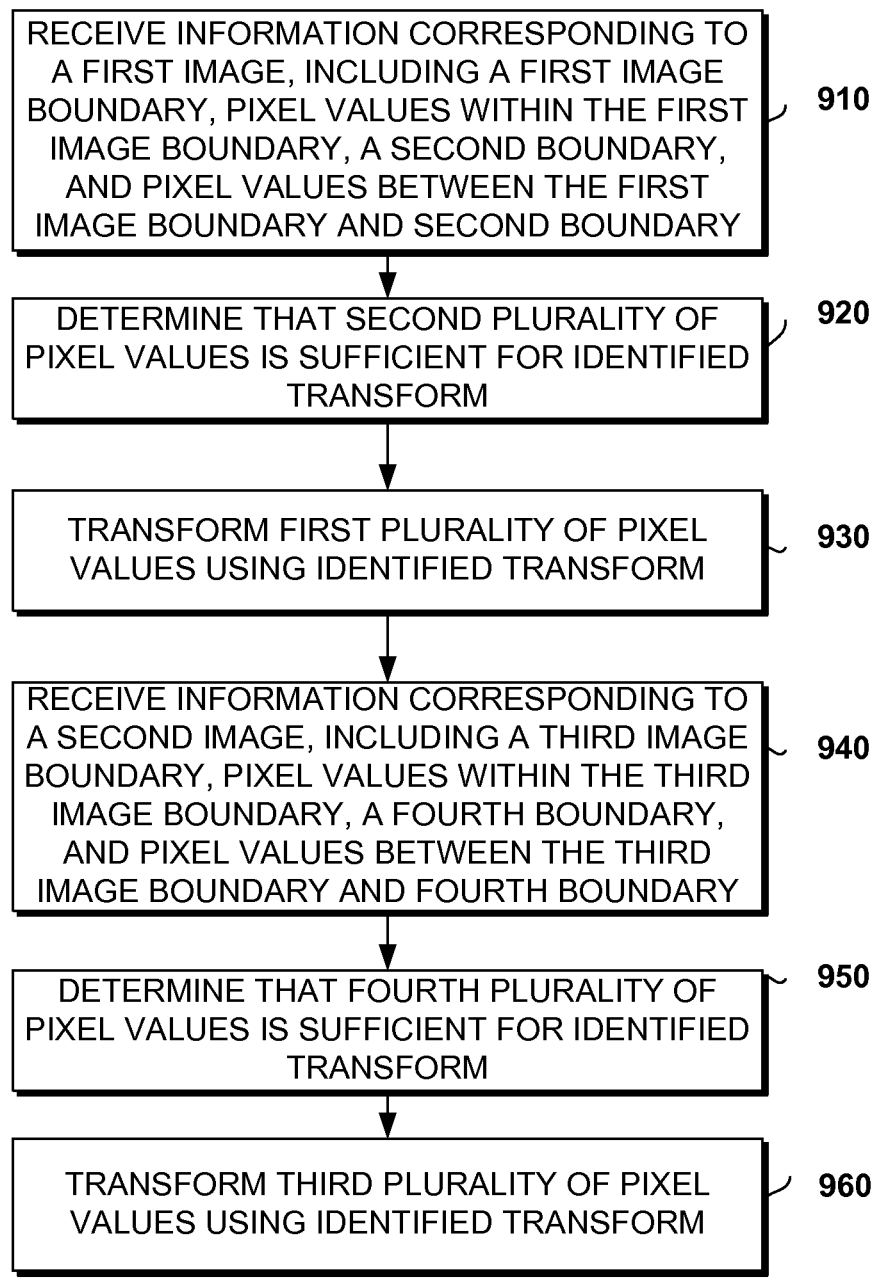

FIG. 9 shows still another example of a method according to the invention. In FIG. 9, information is received 910 that corresponds to a first image. The first image information includes a first image boundary and a first plurality of pixel values for pixels located within the first image boundary. The first image information also includes a second boundary and a second plurality of pixel values for pixels located between the image boundary and the second boundary. Preferably, the first image boundary is contained within the second boundary. Next, it is determined 920 that the second plurality of pixel values is sufficient to perform an identified transform. The sufficiency of the second plurality of pixel values is based on whether the transform is well-defined for all pixel values within the image boundary. The plurality of pixel values within the first image boundary is then transformed 930. Information is then received 940 that corresponds to a second image. The second image information includes a third image boundary and a third plurality of pixel values for pixels located within the third image boundary. The second image information also includes a fourth boundary and a fourth plurality of pixel values for pixels located between the third image boundary and the fourth boundary. Preferably, the third image boundary is contained within the fourth boundary. Next, it is determined 950 that the fourth plurality of pixel values is sufficient to perform the identified transform. The plurality of pixel values within the third image boundary is then transformed 960.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

In an embodiment, a computer-implemented method for transforming an image is provided. The method includes receiving information corresponding to an image, the image information including an image boundary, a plurality of pixel values for pixels located within the image boundary, a second boundary, the image boundary being contained within the second boundary, and a second plurality of pixel values for pixels located between the image boundary and the second boundary; identifying a transform to perform on the plurality of pixel values for pixels located within the image boundary, the identified transform involving use of two or more pixel values to calculate a transformed pixel value; determining that the second plurality of pixel values is sufficient to allow the identified transform to be performed on the plurality of pixel values for pixels located within the image boundary; and transforming the plurality of pixel values located within the image boundary using the identified transform.

In another embodiment, one or more computer-storage media storing computer-useable instructions that, when executed by a computing device, perform a method for transforming an image. The method includes receiving information corresponding to an image, the image information including an image boundary, a plurality of pixel values for pixels located within the image boundary, and a second boundary, the image boundary being contained within the second boundary; identifying a transform to perform on the plurality of pixel values for pixels located within the image boundary, the identified transform involving a rotation around a point located between the image boundary and the second boundary; and transforming the plurality of pixel values located within the image boundary using the identified transform.

In still another embodiment, one or more computer-storage media storing computer-useable instructions that, when executed by a computing device, perform a method for transforming an image. The method includes receiving information corresponding to a first image, the first image information including an image boundary, a plurality of pixel values for pixels located within the image boundary, a second boundary, the image boundary being contained within the second boundary, and a second plurality of pixel values for pixels located between the image boundary and the second boundary; determining that the second plurality of pixel values is sufficient to allow an identified transform to be performed on the plurality of pixel values for pixels located within the image boundary, the identified transform involving use of two or more pixel values to calculate a transformed pixel value; transforming the plurality of pixel values located within the image boundary using the identified transform; receiving information corresponding to a second image, the second image information including a third image boundary, a third plurality of pixel values for pixels located within the third image boundary, a fourth boundary, the third image boundary being contained within the fourth boundary, and a fourth plurality of pixel values for pixels located between the third image boundary and the fourth boundary, wherein the fourth plurality of pixel values is different from the second plurality of pixel values; determining that the fourth plurality of pixel values is sufficient to allow the identified transform to be performed on the third plurality of pixel values for pixels located within the third image boundary; and transforming the third plurality of pixel values located within the third image boundary using the identified transform.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A computer-implemented method for transforming an image, comprising:
   receiving information corresponding to an image, the image information including
      an image boundary,
      a plurality of pixel values for pixels located within the image boundary,
      a second boundary, the image boundary being contained within the second boundary, and
      a second plurality of pixel values for pixels located between the image boundary and the second boundary;
   identifying a transform to perform on the plurality of pixel values for pixels located within the image boundary, the identified transform involving use of two or more pixel values to calculate a transformed pixel value;
   determining that the second plurality of pixel values is sufficient to allow the identified transform to be performed on the plurality of pixel values for pixels located within the image boundary; and
   transforming the plurality of pixel values located within the image boundary using the identified transform
   wherein at least one pixel value of the second plurality of pixel values is based on a pixel value of a second image portion, the image and the second image portion being different image portions of a parent image in an atlas of image portions corresponding to the parent image.

2. The computer-implemented method of claim 1, wherein a pixel value comprises a plurality of color values and a transparency value.

3. The computer-implemented method of claim 1, wherein the transform is identified based on a transform request received with the information corresponding to the image.

4. The computer-implemented method of claim 1, wherein the identified transform comprises calculating a weighted average of pixel values, the weighted average of pixel values being based on pixels from a plurality of rows of pixel values, a plurality of columns of pixel values, or a combination thereof.

5. The computer-implemented method of claim 1, wherein determining that the second plurality of pixel values is sufficient comprises determining a number of pixels per row located between the image boundary and the second boundary.

6. The computer-implemented method of claim 1, further comprising providing the transformed image for display on a display device.

7. The computer-implemented method of claim 1, further comprising a third boundary, the second boundary being containing within the third boundary.

8. The computer-implemented method of claim 1, wherein the image information further includes an image format for at least one of the first plurality of pixel values and the second plurality of pixel values.

9. One or more computer-storage media storing computer-useable instructions that, when executed by a computing device, perform a method for transforming an image, comprising:
   receiving information corresponding to an image, the image information including an image boundary, a plurality of pixel values for pixels located within the Image boundary, a second boundary, the image boundary being contained within the second boundary; a third boundary, the third boundary containing the image boundary, the third boundary being contained by the second boundary, and a second plurality of pixel values for pixels located between the image boundary and the third boundary;
   identifying a transform to perform on the plurality of pixel values for pixels located within the image boundary, the identified transform involving a rotation around a point located between the third image boundary and the second boundary; and transforming the plurality of pixel values located within the image boundary using the identified transform, wherein at least one pixel value of the second plurality of pixel values is based on a pixel value of a second image portion, the image and the second image portion being different image portions of a parent image in an atlas of image portions corresponding to the parent image.

10. The computer-storage media of claim 9, wherein the received information corresponds to an image portion of a parent image.

11. The computer-storage media of claim 10, wherein at least one pixel value of the second plurality of pixel values is based on a pixel value of a corresponding pixel from the parent image.

12. The computer-storage media of claim 10, wherein image portion comprises an image portion from an atlas of image portions.

13. The computer-storage media of claim 9, wherein at least one pixel value of the second plurality of pixel values corresponds to a transparent black pixel value.

14. One or more computer-storage media storing computer-useable instructions that, when executed by a computing device, perform a method for transforming an image, comprising:

receiving information corresponding to a first image, the first image information including an image boundary, a plurality of pixel values for pixels located within the image boundary, a second boundary, the image boundary being contained within the second boundary, and a second plurality of pixel values for pixels located between the image boundary and the second boundary, wherein at least one pixel value of the second plurality of pixel values corresponds to a transparent black pixel value; determining that the second plurality of pixel values is sufficient to allow an identified transform to be performed on the plurality of pixel values for pixels located within the image boundary, the identified transform involving use of two or more pixel values to calculate a transformed pixel value; transforming the plurality of pixel values located within the image boundary using the identified transform; receiving information corresponding to a second image, the second image information including a third image boundary, a third plurality of pixel values for pixels located within the third image boundary, a fourth boundary, the third image boundary being contained within the fourth boundary, and a fourth plurality of pixel values for pixels located between the third image boundary and the fourth boundary, wherein the fourth plurality of pixel values is different from the second plurality of pixel values based on at least a number of pixel values per row, and wherein at least one pixel value of the fourth plurality of pixel values corresponds to a transparent black pixel value; determining that the fourth plurality of pixel values is sufficient to allow the identified transform to be performed on the third plurality of pixel values for pixels located within the third image boundary; and transforming the third plurality of pixel values located within the third image boundary using the identified transform, wherein at least one pixel value of the second plurality of pixel values is based on a pixel value of a third image portion, the first image and the third image portion being different image portions of a parent image in an atlas of image portions corresponding to the parent image.

15. The computer-storage media of claim 14, wherein a number of pixel values in the first plurality of pixel values is the same as a number of pixels in the third plurality of pixel values.

* * * * *